US010266182B2

(12) United States Patent
Krishnan et al.

(10) Patent No.: US 10,266,182 B2
(45) Date of Patent: Apr. 23, 2019

(54) AUTONOMOUS-VEHICLE-CONTROL SYSTEM AND METHOD INCORPORATING OCCUPANT PREFERENCES

(71) Applicant: Ford Global Technologies, LLC, Dearborn, MI (US)

(72) Inventors: Lakshmi Krishnan, Santa Clara, CA (US); Francois Charette, Tracy, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 15/402,960

(22) Filed: Jan. 10, 2017

(65) Prior Publication Data

US 2018/0194366 A1 Jul. 12, 2018

(51) Int. Cl.
*G01C 22/00* (2006.01)
*B60W 50/10* (2012.01)
(Continued)

(52) U.S. Cl.
CPC ............ *B60W 50/10* (2013.01); *B60W 40/08* (2013.01); *G01C 21/00* (2013.01); *G10L 15/22* (2013.01);
(Continued)

(58) Field of Classification Search
CPC .. B60W 50/10; B60W 40/08; B60W 2550/22; B60W 2040/089;
(Continued)

(56) References Cited

U.S. PATENT DOCUMENTS

| 5,592,385 A * | 1/1997 | Katayama | .............. B60K 31/00 701/300 |
| 7,986,974 B2 * | 7/2011 | Arun | ..................... H04M 1/271 379/406.03 |

(Continued)

FOREIGN PATENT DOCUMENTS

| CN | 203163745 U | 8/2013 |
| CN | 105799710 A | 7/2016 |

(Continued)

OTHER PUBLICATIONS

Samsung & BMW are working on self-driving cars lead . . . by voice—Voklee, Oct. 10, 2016.

*Primary Examiner* — Shardul D Patel
(74) *Attorney, Agent, or Firm* — David R. Stevens; Stevens Law Group

(57) ABSTRACT

A method is disclosed for incorporating preferences of a human occupant into an autonomous driving experience. The method may include a computer system autonomously controlling speed and steering of a vehicle. While it is controlling the vehicle, the computer system may interpret a speech command received from a human occupant of the vehicle. The computer system may determine whether changing at least one of the speed and steering in accordance with the speech command would be safe and legal. If it would be safe and legal, the computer system may change the at least one of the speed and steering in accordance with the speech command. If it would not be safe and legal, the computer system may leave the at least one of the speed and steering unchanged in contravention of the speech command.

17 Claims, 4 Drawing Sheets

(51) Int. Cl.
  *B60W 40/08* (2012.01)
  *G10L 15/22* (2006.01)
  *G01C 21/00* (2006.01)

(52) U.S. Cl.
  CPC ... *B60W 2040/089* (2013.01); *B60W 2550/22* (2013.01); *B60W 2710/20* (2013.01); *B60W 2720/10* (2013.01); *G10L 2015/223* (2013.01); *G10L 2015/228* (2013.01)

(58) Field of Classification Search
  CPC .......... B60W 2710/20; B60W 2720/10; G05D 1/0088; G05D 2201/0212; G10L 15/22; G10L 2015/223; G10L 2015/228
  USPC .................................................... 701/23, 300
  See application file for complete search history.

(56) References Cited

U.S. PATENT DOCUMENTS

| | | | |
|---|---|---|---|
| 9,371,007 B1* | 6/2016 | Penilla | ................ B60L 11/1848 |
| 2011/0301802 A1 | 12/2011 | Rupp et al. | |
| 2012/0271500 A1* | 10/2012 | Tsimhoni | ................. B62D 1/28 701/23 |
| 2016/0114805 A1 | 4/2016 | Yang et al. | |
| 2016/0207528 A1 | 7/2016 | Stefan et al. | |
| 2016/0221573 A1* | 8/2016 | Prokhorov | ............ B60W 30/08 |
| 2017/0109947 A1* | 4/2017 | Prokhorov | ........... G07C 5/0816 |
| 2017/0248957 A1* | 8/2017 | Delp | ..................... B60W 30/00 |
| 2017/0297588 A1* | 10/2017 | Doshi | ................... B60W 50/10 |
| 2017/0316533 A1* | 11/2017 | Goldman-Shenhar | ....................... G06Q 50/30 |

FOREIGN PATENT DOCUMENTS

| | | |
|---|---|---|
| DE | 102012001312 | 8/2012 |
| WO | 2007/070160 | 6/2007 |
| WO | 2016/012901 | 1/2016 |
| WO | 2016/109540 | 7/2016 |
| WO | WO2018/014697 | 1/2018 |
| WO | WO2018/057663 | 3/2018 |

* cited by examiner

AUTONOMOUS-VEHICLE-CONTROL SYSTEM AND METHOD INCORPORATING OCCUPANT PREFERENCES

BACKGROUND

Field of the Invention

This invention relates to vehicular systems and more particularly to systems and methods for incorporating preferences of one or more occupants into an autonomous driving experience.

Background of the Invention

At any given time, an autonomous vehicle may drive or operate in various different ways that may all be considered safe and legal. Moreover, the particular way an autonomous vehicle chooses to drive or operate may be uncomfortable for or contrary to the wishes of a human occupant thereto. Accordingly, what is needed is a system and method for incorporating occupant preferences into an autonomous driving experience.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
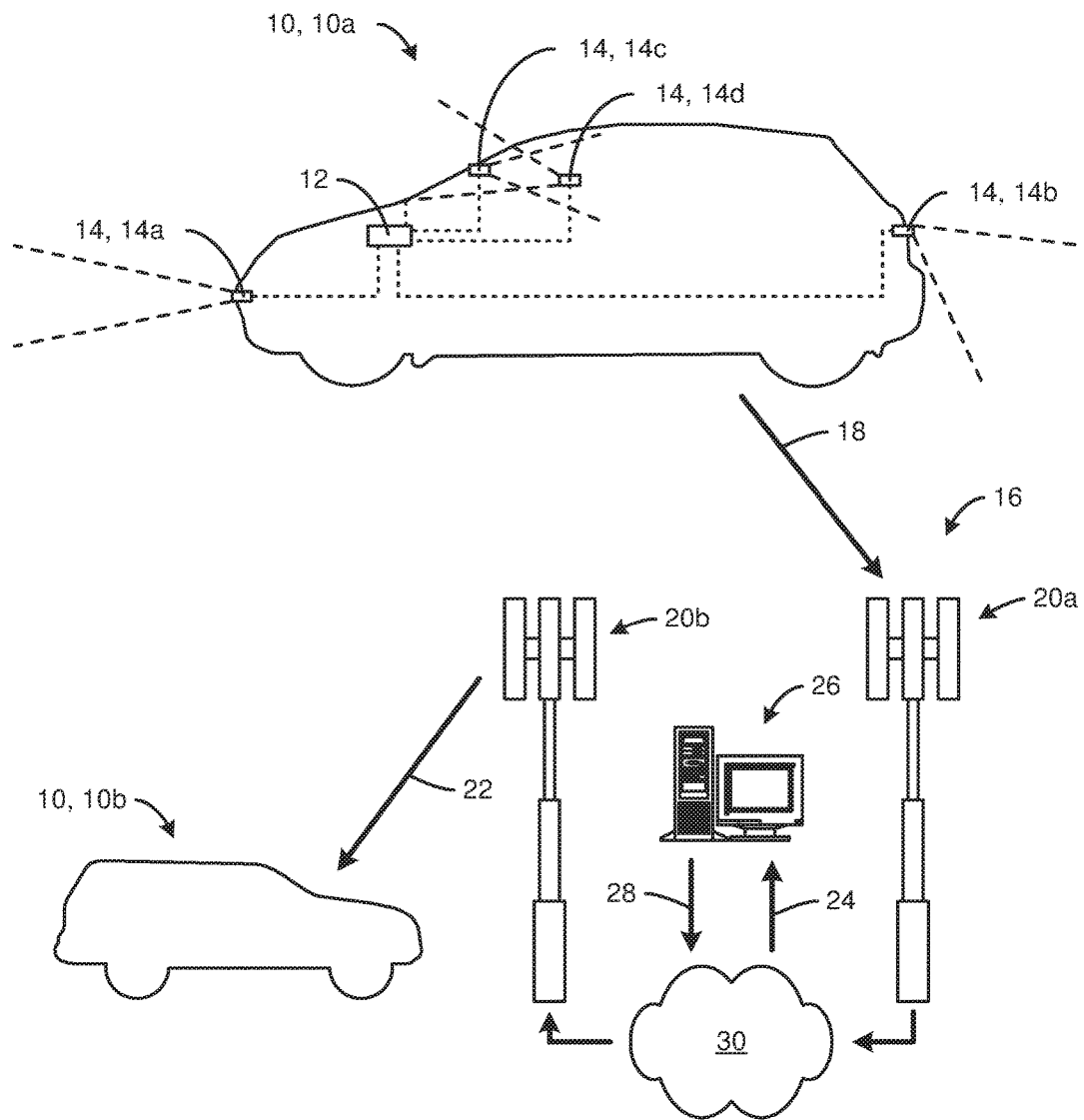
FIG. 1 is a schematic diagram illustrating one embodiment of the technological context within which a system and method for incorporating occupant preferences in accordance with the present invention may operate.

Referring to FIG. 1, an autonomous vehicle 10 may have significant latitude in deciding how to navigate the array of options and conditions found in real world driving. Accordingly, when an autonomous vehicle 10 decides to navigate a journey, section of road, or the like in a particular manner, that particular manner is usually not the only way the journey, section of road, etc. could have been safely and legally navigated.

For example, an autonomous vehicle 10 may decide to take a particular corner at 20 miles per hour. However, given the geometry of the corner and the current road conditions, a speed range for safely and legally taking the corner may be anywhere from about 5 miles per hour to about 25 miles per hour. Thus, the 20 miles per hour decided upon by the autonomous vehicle 10 may be one of many acceptable solutions for navigating the corner.

Similarly, an autonomous vehicle 10 may decide to take a particular route to a destination. However, given the available roads, multiple routes may enable the autonomous vehicle 10 to reach the destination in a comparable amount of time. Thus, the particular route decided upon by the autonomous vehicle 10 may be one of many acceptable routes for reaching the destination.

In selected embodiments, an autonomous vehicle 10 may include a plurality of default settings. Default settings may enable an autonomous vehicle 10 to decide how to operate when multiple acceptable options are available. For example, if an algorithm of an autonomous vehicles 10 were to consider the geometry of a corner and the current road conditions and determine a maximum safe speed through the corner, a default setting might dictate that an autonomous vehicle 10 navigate the corner at 80% of that maximum speed. Similarly, if a navigation system of an autonomous vehicle 10 were to identify multiple possible routes to a destination, a default setting might dictate that an autonomous vehicle 10 take the route requiring the least amount of time.

Default settings may reflect one or more beliefs (e.g., empirically justified selections, mere assumptions, or the like) regarding what most occupants would prefer. However, any given occupant may not be fully comfortable with all of the default settings of an autonomous vehicle 10. This lack of comfort may delay or even deter adoption of autonomous vehicles 10.

Accordingly, while remaining compliant with safety and legal requirements (e.g., while remaining within certain predetermined physical and legal thresholds), autonomous vehicles 10 in accordance with the present invention may enable one or more occupants to quickly and easily adjust or customize one or more default settings thereof. In certain embodiments, this may be accomplished by receiving, collecting, generating, and/or storing information characterizing one or more preferences of an occupant. Such preferences may then be used to customize certain default settings of an autonomous vehicle 10 (and, thereby, alter certain future operations or functions of an autonomous vehicle 10) whenever doing so would not violate safety and legal requirements (e.g., exceed predetermined physical and legal thresholds).

In selected embodiments, an autonomous vehicle 10 in accordance with the present invention may comprise a computerized system 12 and a plurality of sensors 14. A system 12 may use the outputs of one or more such sensors 14 to determine how best to control various functions or operations of the corresponding autonomous vehicle 10. The sensors 14 included within an autonomous vehicle 10 may take any suitable form. For example, one or more sensors 14 may comprise cameras, lidar devices, radar devices, ultrasonic transducers, accelerometers, gyroscopes, speedometers, thermometers, drive train sensors (e.g., devices for sensing RPM of an engine, wheel slippage, or the like), global positioning system (GPS) devices, or the like, or a combination or sub-combination thereof.

In certain embodiments, a system 12 in accordance with the present invention may control one or more core functions of an autonomous vehicle 10 (i.e., functions that are fundamental to the driving of the autonomous vehicle 10). For example, a system 12 may autonomously control the steering and/or speed of a vehicle 10. Thus, a system 12 may control a collection of components, linkages, actuators, or the like that affect the course taken by the vehicle 10, throttle setting on an engine, braking, or the like or a combination or sub-combination thereof.

Additionally, a system 12 may control one or more peripheral functions of an autonomous vehicle 10 (i.e., functions that are not fundamental to the driving of the autonomous vehicle 10). For example, a system 12 may control the position of one or more seats within a vehicle 10, a climate control system, media settings (e.g., radio stations, television stations, or the like to which a vehicle 10 is tuned), tint of one or more windows, or the like or a combination or sub-combination thereof.

In certain embodiments, one or more sensors 14 in accordance with the present invention may be forward-facing sensors 14a (e.g., cameras, lidar devices, radar devices, ultrasonic transducers, or the like directed to an area ahead of a vehicle 10), rearward-facing sensors 14b (e.g., back-up cameras or lidar devices, radar devices, ultrasonic transducers, or the like directed to an area behind a vehicle 10), side view sensors (e.g., cameras, lidar devices, radar devices, ultrasonic transducers, or the like directed to an area to a side of a vehicle 10), occupant sensors 14c (e.g., cameras directed toward or capturing images of one or more occupants of a vehicle 10), point-of-view sensors 14d (e.g., cameras, lidar devices, radar devices, or the like capturing an occupant's point of view of and/or through a windshield or other window), or the like or a combination or sub-combination thereof.

In selected embodiments, information received, collected, or generated by a system 12 (or portions of a system 12) on-board an autonomous vehicle 10 may be communicated to some hardware located off-board the autonomous vehicle 10. That is, such information may be passed vehicle-to-infrastructure (V2I). For example, information received, collected, or generated by a system 12 corresponding to one autonomous vehicle 10a may be passed through a communication system 16 to one or more other autonomous vehicles 10b. Accordingly, information received, collected, or generated by a system 12 corresponding to one autonomous vehicle 10a may be used (e.g., wholly adopted or taken into consideration) by systems 12 corresponding to one or more other autonomous vehicles 10b.

In selected embodiments, selected information may be passed by a system 12 into a communication system 16 comprising stationary telecommunication infrastructure. For example, a system 12 may feed 18 selected information into a cellular telephone network by sending one or more signals to a nearby cellular tower 20a. In selected embodiments, information fed 18 in by a system 12 may be routed through a communication system 16 and delivered 22 to corresponding systems 12 of one or more other vehicles 10b. Alternatively, information fed 18 into a communication system 16 by a system 12 may be delivered 24 to a computer system 26, processed by the computer system 26, fed 28 by the computer system 26 back into the communications system 16, and delivered 22 to corresponding systems 14 of one or more other vehicles 10b.

For example, in selected embodiments, a communication system 16 may include a cellular telephone network comprising a first cellular tower 20a located near a first autonomous vehicle 10a, a second cellular tower 20b located near a second autonomous vehicle 10b, and a network 30 connecting the first cellular tower 20a to the second cellular tower 20b. A computer system 26 may also connect to the network 30. Accordingly, information fed 18 into the cellular telephone network by a system 12 corresponding to the first vehicle 10a may be received by the computer system 26 so that it can be recorded and/or processed and distributed to one or more other vehicles 10b, or the like or a combination or sub-combination thereof.

In certain embodiments, the information passed from a first autonomous vehicle 10a to a computer system 26 connected to the network 30, a second autonomous vehicle 10b, or the like may characterize one or more preferences of a first human occupant (i.e., an occupant at least at one time) of the first autonomous vehicle 10a. Accordingly, should the first human occupant issue a command or request (e.g., a speech command) communicating a particular preference while occupying the first autonomous vehicle 10a, that preference may be made available to (and, therefore, implemented by) the second autonomous vehicle 10b when the first human occupant occupies it.

Preferences received, collected, generated, and/or stored by systems 12, 26 in accordance with the present invention may relate to any core or peripheral functions of an autonomous vehicle 10. Accordingly, by way of example and not limitation, such preferences may relate to default settings regarding: speed; speed through corners; lane choice (e.g., which lane to use on multilane roads); acceleration (e.g., how aggressively to actuate a throttle of an engine); braking (e.g., how aggressively to actuate a brake or how soon to being braking); suspension settings (e.g., whether a tighter or softer suspension setting is desired); route (e.g., whether to choose routes based on time, mileage, fuel economy, or the like or which routes are preferred over others); settings of climate control systems (e.g., temperature, fan speed, preferred vent openings or registers for air flows); tint or shading of one or more windows (e.g., settings for one or more windows of variable transmittance); settings of media systems (e.g., which radio stations to play, audio media to stream, visual media to display, movies or video programs to offer or continuing playing when left unfinished in a previous ride); possible destinations; possible points-of-interest or intermediate stops along route to a destination; advertisements to display or present; or the like or a combination or sub-combination thereof.

In selected embodiments, certain preferences received, collected, generated, and/or stored by systems 12, 26 in accordance with the present invention may be general (e.g., apply to many locations in a driving environment). Other preferences received, collected, generated, and/or stored by systems 12, 26 in accordance with the present invention may be specific (e.g., apply to only one location in a driving environment). For example, one preference may address the speed at which all corners are navigated. Another preference may address the speed at which a particular corner is navigated. In situations where a general preference is in conflict with a specific preference, the specific preference may be given priority over the general preference. Accordingly, the variety of functions and range of specificity addressed by preferences in accordance with the present invention may be substantially limitless.

Figure 2:
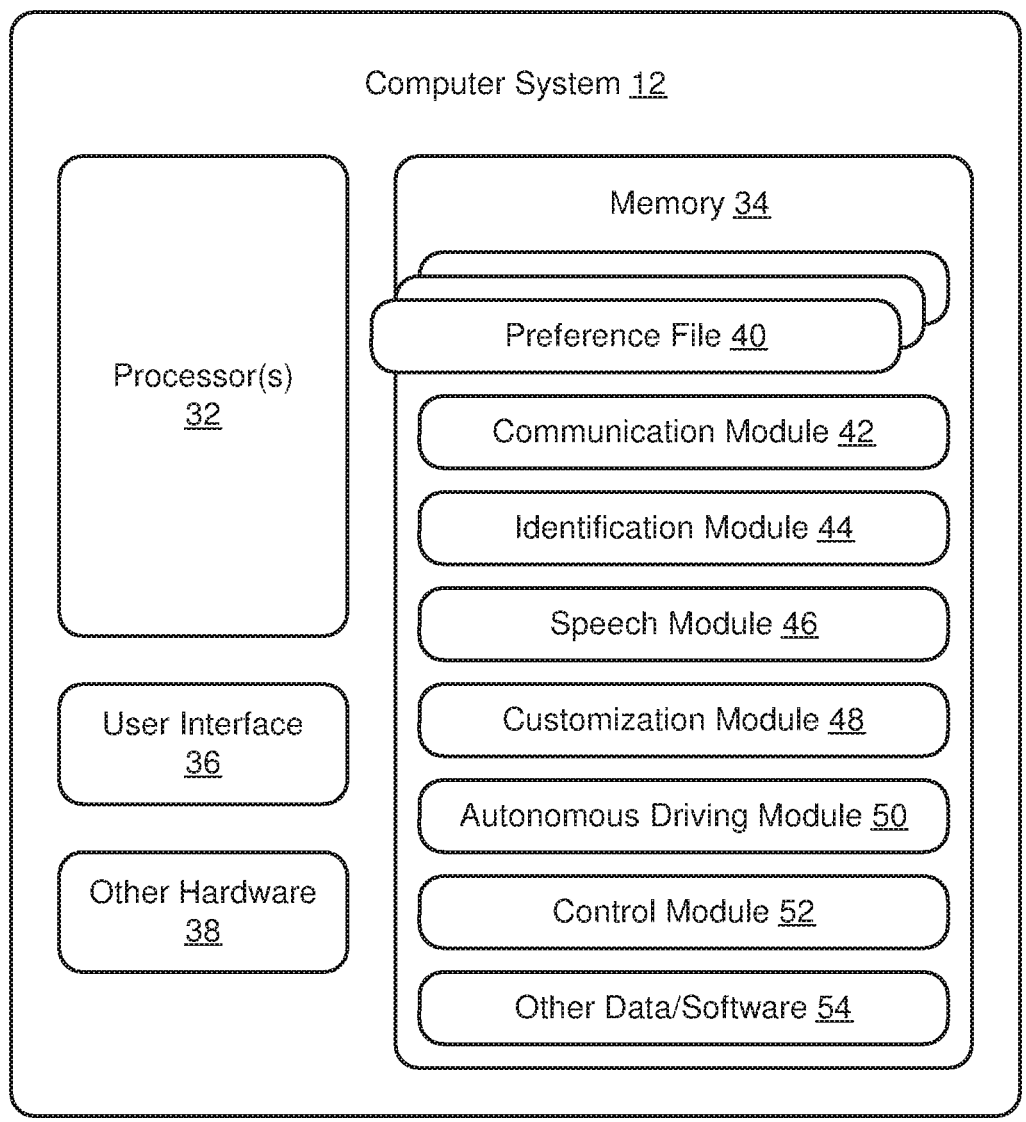
FIG. 2 is a schematic block diagram illustrating one embodiment of a system for incorporating occupant preferences within an autonomous driving experience in accordance with the present invention.

Referring to FIG. 2, a system 12 in accordance with the present invention may operate in any suitable manner to support customization of an autonomous driving experience. For example, a system 12 may be embodied as hardware, software, or some combination thereof.

In selected embodiments, a system 12 may include computer hardware and computer software. The computer hardware of a system 12 may include one or more processors 32, memory 34, one or more user interfaces 36, other hardware 38, or the like or a combination or sub-combination thereof. In certain embodiments, all or some subset of this computer hardware may be hardware already included as part of a vehicle 10. That is, all or some portion of the computer hardware may be multipurpose and perform tasks that are already associated with the operation of the vehicle 10. Alternatively, a system 12 in accordance with the present invention may be dedicated exclusively to enabling, support, and/or providing autonomous driving and selected customization thereof.

The memory 34 of a system 12 in accordance with the present invention may be operably connected to the one or more processors 32 and store the computer software. This may enable the one or more processors 32 to execute the computer software. Thus, a system 12 may augment the functionality or features of a vehicle 10 by adding and/or modifying software, adding additional hardware to the vehicle 10, or a combination thereof.

A user interface 36 of a system 12 may enable an engineer, technician, occupant (e.g., passenger), or the like to interact with, run, customize, or control various aspects of a system 12. A user interface 36 may enable a user to manually control (e.g., select, type in, incrementally increase or decrease at the touch of a button or twist of a knob) and/or orally control (e.g., issue one or more commands or requests using his or her voice) one or more settings (e.g., default settings) in order to customize an autonomous driving experience to his or her liking. In selected embodiments, a user interface 36 of a system 12 may include one or more buttons, switches, knobs, keypads, keyboards, touch screens, pointing devices, microphones, speakers, or the like or a combination or sub-combination thereof. Alternatively, or in addition thereto, a user interface 36 may comprise one or more communication ports (e.g., plug in ports, wireless communication ports, etc.) through which one or more external computers or devices may communicate with a system 12 or one or more components thereof.

In selected embodiments, the memory 34 of a system 12 may store (at least temporality) one or more preference files 40. A preference file 40 may contain information characterizing one or more preferences corresponding to a human occupant. For example, in certain embodiments, a preference file 40 may link a particular human occupant (e.g., via a unique identification number, code, or the like) to one or more preferences derived from or originating with that human occupant.

Additionally, the memory 34 may store one or more software modules. For example, the memory 34 may store a communication module 42, identification module 44, speech module 46, customization module 48, autonomous driving module 50, control module 52, other data or software 54, or the like or a combination or sub-combinations thereof. Alternatively, one or more of the communication module 42, identification module 44, speech module 46, customization module 48, autonomous driving module 50, and control module 52 may be embodied as hardware or comprise hardware components. Thus, while FIG. 2 shows the communication module 42, identification module 44, speech module 46, customization module 48, autonomous driving module 50, and control module 52 as being software-only modules that are stored in memory 34, in actuality, one or more of these modules 42, 44, 46, 48, 50, 52 may comprise hardware, software, or a combination thereof.

A communication module 42 may enable data such as one or more preference files 40, software components (e.g., one or more modules 42, 44, 46, 48, 50, 52 or updates thereto), or the like or combinations of sub-combinations thereof to be passed (e.g., passed 18, 22 via radio waves) into or out of a system 12 in accordance with the present invention. For example, a communication module 42 forming part of a system 12 carried on-board one vehicle 10b may enable that system 12 to receive or use information (e.g., one or more preference files 40) generated by or corresponding to another vehicle 10a. Alternatively, or in addition thereto, a communication module 42 may enable a system 12 to receive an update to its autonomous driving module 50. Accordingly, improvements developed off-board a vehicle 10 may be brought on-board as desired or necessary.

An identification module 44 may determine an identity of one or more human occupants of an autonomous vehicle 10. An identification module 44 may do this in any suitable manner. For example, an identification module 44 may obtain an identification number, code, or the like from an occupant via wireless or near field communication (e.g., wireless or near field communication with a key fob, smart phone, or some other device carried by the occupant), a radio-frequency identification (RFID) tag, or the like. In other embodiments, an identification module 44 may obtain an identification number, code, or the like directly from an occupant in an exchange over a user interface 36. For example, an occupant may type something in on a user interface 36, present a barcode, QR code, or the like to be scanned, and/or identify himself or herself by speaking a name, identification number, code, or the like. In still other embodiments, an identification module 44 may determine an identity of an occupant using facial recognition or the like.

A speech module 46 may enable a system 12 to recognize and understand information, commands, requests, or the like provided by an occupant using his or her voice. Accordingly, in selected embodiments, a speech module 46 may provide, enable, or support certain capabilities with respect to automatic speech recognition (ASR) and natural language understanding (NLU). Leveraging such technologies, a speech module 46 may enable one or more speech commands or requests (e.g., words or phrases spoken by one or more occupants of an autonomous vehicle 10 to the autonomous vehicle 10 or one or more systems 12 thereof) to be properly interpreted and form the basis of one or more usable and storable preferences (e.g., become part of one or more preference files 40 that link one or more computer-interpretable preferences with one or more occupants corresponding thereto).

A customization module 48 may be programmed to identify one or more preferences that may be applicable to a present situation (e.g., applicable to a current occupant of an autonomous vehicle 10 and/or applicable to a current location, road, corner, route, destination, or the like of an autonomous vehicle 10). In selected embodiments, this may be accomplished by searching for preferences within one or more preferences files 40 (e.g., within a database of preferences files 40) that are tagged with an identification corresponding to a current occupant, tagged with a location (e.g., geographic coordinate) or specific feature (e.g., road) being approached by the corresponding autonomous vehicle 10, and/or tagged with a feature type that matches or encompasses a feature being approached by the corresponding autonomous vehicle. Once one or more preferences applicable to a present situation have been identified, a customization module 48 may work with an autonomous driving module 50 to see if one or more such preferences can be safely and legally accommodated (e.g., used to alter a default setting or some functionality or operation of the corresponding autonomous vehicle 10).

An autonomous driving module 50 may be an extensive sub-system programmed to use various informational inputs (e.g., sensor data, images, or the like from one or more sensors 14, GPS data, digital maps, or the like or a combination or sub-combination thereof) to decide how to drive a corresponding autonomous vehicle 10. Accordingly, an autonomous driving module 50 may determine when to speed up, how fast to drive, when to slow down, how hard to brake, when to turn left and how far left, when to turn right and how far right, or the like or any other function or operation for which autonomous control is desired.

A control module 52 may be programmed to request, initiate, or implement one or more actions or functions based on one or more determinations made by an autonomous driving module 50. For example, when an autonomous driving module 50 determines that a vehicle 10 should apply maximum braking, a control module 52 may control one or more actuators to implement that determination.

Figure 3:
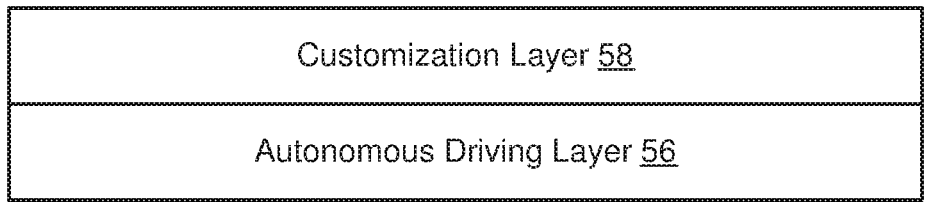
FIG. 3 is a schematic block diagram illustrating two levels or layers of abstraction corresponding to a system for incorporating occupant preferences within an autonomous driving experience in accordance with the present invention.

Referring to FIG. 3, in selected embodiments, a system 12 in accordance with the present invention may be visualized as providing at least two levels of abstraction. A first, more fundamental level of abstraction may be visualized as an autonomous driving layer 56. This first layer 56 may largely correspond to an autonomous driving module 50. A second, less fundamental level of abstraction may be visualized as a customization layer 58. This second layer 58 may largely correspond to a customization module 48. So organized, a customization layer 58 may only operate in a space or manner that is within the confines set by an autonomous driving layer 56.

Accordingly, in operation, a customization layer 58 may generate one or more requests and pass them to an autonomous driving layer 56. Each such request may correspond to or comprise one or more preferences. An autonomous driving layer 56 may analyze each such request to determine whether the preferences corresponding thereto are permissible from both a safety and legal standpoint (e.g., within certain safety and legal thresholds). If an autonomous driving layer 56 determines that the preferences are permissible, the autonomous driving layer 56 may alter the operation or functionality of the corresponding autonomous vehicle 10 in accordance with the preferences. Conversely, if an autonomous driving layer 56 determines that the preferences are impermissible, the autonomous driving layer 56 may so inform a corresponding customization layer 58.

Figure 4:
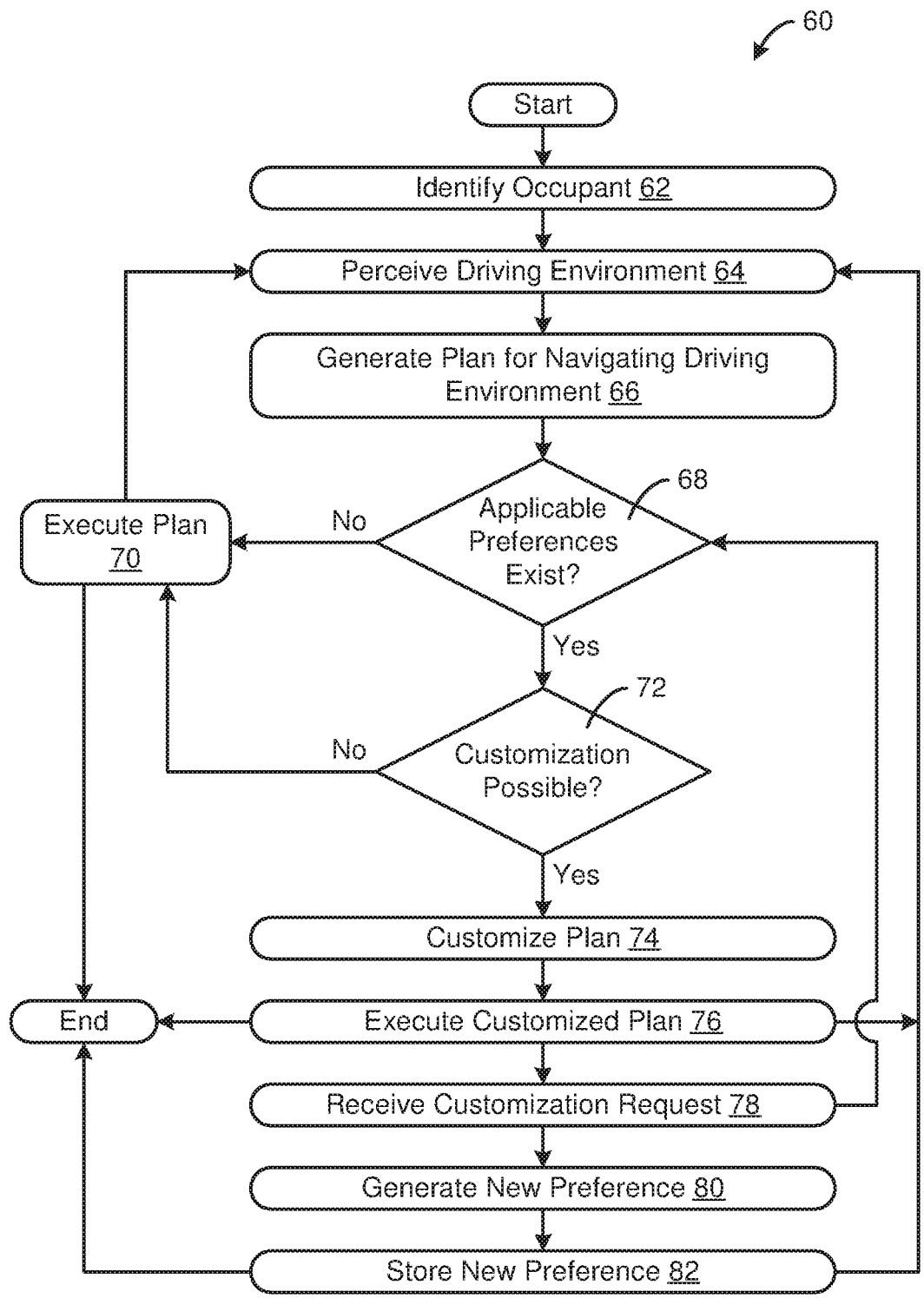
FIG. 4 is a schematic block diagram of one embodiment of a method for incorporating occupant preferences within certain core functions of an autonomous driving experience in accordance with the present invention.

Referring to FIG. 4, in selected embodiments, a method 60 of customizing one or more core functions of an autonomous driving experience may include identifying 62 a human occupant of an autonomous vehicle 10. The method 60 may further include perceiving 64 (e.g., via one or more sensors 14) a driving environment surrounding the autonomous vehicle 10. Accordingly, based on its perception of the driving environment, the autonomous vehicle 10 may generate 66 a plan for navigating the driving environment (e.g., may apply one or more default settings when deciding how to navigate one or more features in a driving environment).

At some point, a determination 68 may be made as to whether any applicable preferences exist. In selected embodiments, this may involve determining 68 whether any preferences stored in one or more preferences files 40 or presently derived from one or more speech commands corresponding to an occupant of the autonomous vehicle 10 (e.g., the identified 62 occupant) relate to or address some feature (e.g., road, corner, route, etc.) that the autonomous vehicle 10 is presently navigating or approaching. If no such preferences exist, are found, or are received, the autonomous vehicle 10 may simply execute 70 or continue to execute 70 the plan it has generated 66 (e.g., continue to apply one or more default settings when deciding how to navigate one or more features in a driving environment). Conversely, if one or more applicable preferences do exist or are found, then a determination 72 may be made as to whether the one or more applicable preferences can be implemented (e.g., whether customization of one or more default settings of an autonomous vehicle 10 would produce a result that is within selected safety and/or legal thresholds).

If customization is not possible (e.g., if implementation of one or more applicable preferences would produce a result that is outside of one or more safety and/or legal thresholds), then the autonomous vehicle 10 may simply execute 70 or continue to execute 70 the plan it has generated 66 (e.g., continue to apply one or more default settings when deciding how to navigate one or more features in a driving environment). Conversely, if customization is possible, then the plan that was generated 66 (e.g., one or more default settings) may be customized 74 or changed 74 in accordance with the one or more preferences. Thereafter, the customized plan may be executed 76.

At some point within such a process 60, an autonomous vehicle 10 may receive 78 a customization request from an occupant. Such a request may take various forms. For example, an occupant may communicate a request to an autonomous vehicle 10 by making a selection, typing something in, incrementally increasing or decreasing some setting, or the like. Alternatively, or in addition thereto, an occupant may communicate a request to an autonomous vehicle 10 by using his or her voice.

For example, an occupant may say "I prefer to take corners slower than that." Alternatively, an occupant may say "Please take that corner slower in the future." In still other situations, an occupant may say "Slow down!" or "I prefer to use the right lane on this road." The array of possible voice commands is substantially limitless. In selected embodiments, to aid in differentiating speech commands directed to an autonomous vehicle 10 and speech between multiple occupants of an autonomous vehicle 10, the autonomous vehicle 10 may require that commands or requests directed to it be preceded by a name corresponding to the vehicle 10 (e.g., "Car" or some other name selected for the vehicle 10 by an occupant).

Each speech command or request may be interpreted by an autonomous vehicle 10 (e.g., by a computer system 12 of an autonomous vehicle 10). If it is determined 68 that a recently or just received speech command or request applies to an event or feature that is presently being experienced by an autonomous vehicle 10, a determination 72 may be made as to whether customization is possible in accordance with the one or more preferences corresponding thereto. Accordingly, an autonomous vehicle 10 may apply certain preferences of an occupant substantially immediately upon receiving commands communicating such preferences.

An autonomous vehicle 10 may differentiate between relatively small differences in words or phrases in order to discover and apply the different meanings associated therewith. For example, if an occupant were to say "I prefer to take corners slower than that," the autonomous vehicle 10 may generate 80 a preference that is general in nature (e.g., applies to all corners) and tag it with a particular feature type. Conversely, if an occupant were to say "Please take that corner slower in the future," the autonomous vehicle 10 may generate a specific preference and tag it to a specific corner (e.g., the corner the autonomous vehicle 10 just navigated). Once a new preference has been generated 80, it may be stored 82 (e.g., in a preference file 40) in a manner that it may be used or applied in the future in the autonomous vehicle 10 at issue or in a different autonomous vehicle 10.

Figure 5:
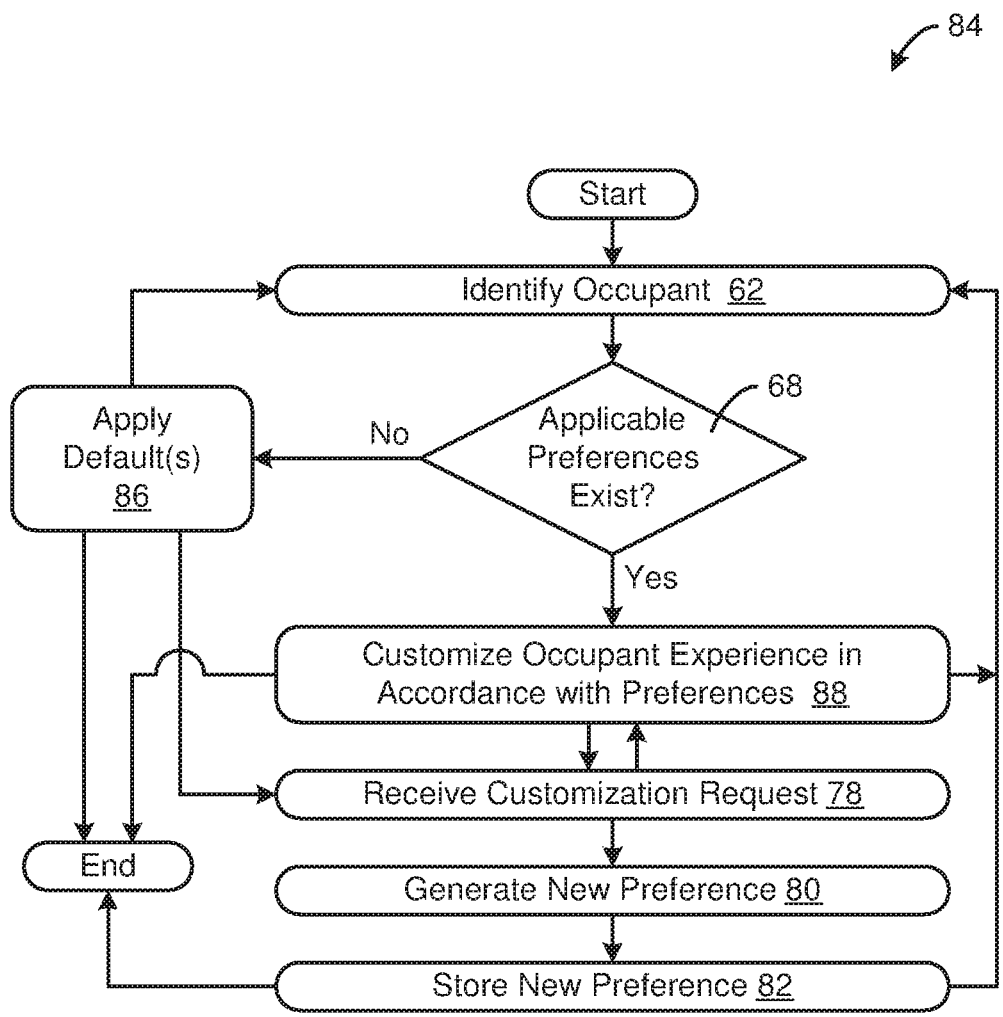
FIG. 5 is a schematic block diagram of one embodiment of a method for incorporating occupant preferences within certain peripheral functions of an autonomous driving experience in accordance with the present invention.

Referring to FIG. 5, in selected embodiments, a method 84 of customizing one or more peripheral functions of an autonomous driving experience may include identifying 62 a human occupant of an autonomous vehicle 10. The method 60 may further include making a determination 68 as to whether any applicable preferences exist. In selected embodiments, this may involve determining 68 whether any preferences stored in one or more preferences files 40 or presently derived from one or more speech commands corresponding to an occupant of the autonomous vehicle 10 (e.g., the identified 62 occupant) relate to or address some peripheral operation or function of the autonomous vehicle 10.

If no such preferences exist, are found, or are received, the autonomous vehicle 10 may simply apply 86 or continue to apply 86 one or more default settings. Conversely, if one or more applicable preferences do exist or are found, then one or more peripheral operations or functions of the autonomous vehicle 10 may be customized 88 or changed 88 in accordance with the one or more preferences. In selected embodiments, there may be no need to for any determination 72 as to whether the one or more applicable preferences can be implemented (e.g., whether customization of one or more default settings of an autonomous vehicle 10 would produce a result that is within selected safety and/or legal thresholds) since peripheral functions and operations deal much more with personal preference (e.g., which radio station to play, which temperature setting for a climate control system) and not safety or legal issues.

At some point within such a process 84, an autonomous vehicle 10 may receive 78 a customization request from an occupant. Such a request may take various forms. For example, an occupant may communicate a request to an autonomous vehicle 10 by making a selection, typing something in, incrementally increasing or decreasing some setting, or the like. Alternatively, or in addition thereto, an occupant may communicate a request to an autonomous vehicle 10 by using his or her voice. Once a new preference has been generated 80, it may be stored 82 (e.g., in a preference file 40) in a manner that it may be used or applied in the future in the autonomous vehicle 10 at issue or in a different autonomous vehicle 10.

The flowcharts in FIGS. 4 and 5 illustrate the architecture, functionality, and operation of possible implementations of systems, methods, and computer-program products according to various embodiments in accordance with the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method comprising:
   autonomously controlling, by a computer system, speed and steering of a vehicle;
   interpreting, by the computer system during the controlling, a speech command received from a human occupant of the vehicle;
   (a) determining, by the computer system, whether changing at least one of the speed and steering in accordance with the speech command would be safe and legal; and
   (b) implementing, by the computer system, the speech command in accordance with (a) at a first time;
   (c) determining a location at which the speech command was received;
   (d) storing the location and the speech command;
   (e) detecting a return navigation to the location a second time after the first time; and
   (f) in response to (e), again implementing, by the computer system, the speech command in accordance with (a).

2. The method of claim 1, wherein the implementing comprises changing the at least one of the speed and steering in accordance with the speech command when the computer system determines it would be safe and legal to do so.

3. The method of claim 1, wherein the implementing comprises leaving the at least one of the speed and steering unchanged in contravention of the speech command when the computer system determines it would be unsafe or illegal to act in accordance with the speech command.

4. The method of claim 1, wherein the implementing comprises changing, as the vehicle navigates a feature corresponding to the location within a real world driving environment, the at least one of the speed and steering in accordance with the speech command when the computer system determines it would be safe and legal to do so.

5. The system of claim 1, wherein the speech command is a command to take a turn at a slower speed and the location is the location of the turn; and
   wherein the system is programmed to respond to the speech command by executing each instance of traversing the turn at the slower speed.

6. A method comprising:
   autonomously controlling, by a first computer system, speed and steering of a first vehicle;
   interpreting, by the first computer system during the controlling, a speech command received from a human occupant of the first vehicle;
   storing, by the first computer system on a remote storage device, information communicated in the speech command as a preference of the human occupant associated with a unique identifier of the human occupant;

autonomously controlling, by a second computer system, speed and steering of a second vehicle distinct from the first vehicle;

detecting, by the second computer system, the human occupant within the second vehicle;

determining, by the second computer system, that human occupant corresponds to the unique identifier;

obtaining, by the second computer system, the preference of the human occupant associated with the unique identifier from the remote storage device;

determining, by the second computer system, whether changing at least one of the speed and steering of the second vehicle in accordance with the preference would be safe and legal; and implementing, by the second computer system, the preference in accordance with the determining.

7. The method of claim 6, wherein the implementing comprises changing the at least one of the speed and steering of the second vehicle in accordance with the preference when the second computer system determines it would be safe and legal to do so.

8. The method of claim 6, wherein the implementing comprises leaving the at least one of the speed and steering of the second vehicle unchanged in contravention of the preference when the second computer system determines it would be unsafe or illegal to act in accordance with the preference.

9. The method of claim 6, wherein the interpreting occurs during a first navigation of a first particular feature within a real world driving environment by the first vehicle.

10. The method of claim 9, wherein the implementing occurs during a second, subsequent navigation of the first particular feature by the second vehicle.

11. The method of claim 9, wherein the implementing occurs while navigating, by the second vehicle, a second particular feature spaced within the real world driving environment from the first particular feature.

12. A system comprising:
at least one processor carried on-board a first autonomous vehicle; and
first memory operably connected to the at least one processor, the first memory storing software programmed to
control speed and steering of the first autonomous vehicle,
interpret a speech command received from a human occupant of the first autonomous vehicle, the speech command being a preference for behavior during a driving maneuver;
autonomously determine to perform the driving maneuver in multiple instances;
for each instance of the multiple instances in which the driving maneuver is performed:
determine whether changing at least one of the speed and steering of the first autonomous vehicle in accordance with the preference is within a range of safe and legal limits, and
change the at least one of the speed and steering of the first autonomous vehicle in accordance with the preference when it is determined that the preference is within the range of safe and legal limits, and
leave the at least one of the speed and steering of the first autonomous vehicle unchanged in contravention of the speech command when it is determined that the preference is not within the range of safe and legal limits.

13. The system of claim 12, wherein the first memory further stores software programmed to store on a remote storage device information communicated in the speech command as a preference of the human occupant.

14. The system of claim 13, further comprising:
one or more processors carried on-board a second autonomous vehicle; and
second memory operably connected to the one or more processors, the second memory storing software programmed to control speed and steering of the second autonomous vehicle.

15. The system of claim 14, wherein the second memory further stores software programmed to:
detect the human occupant within the second autonomous vehicle;
obtain the preference from the remote storage device;
determine whether changing at least one of the speed and steering of the second autonomous vehicle in accordance with the preference would be safe and legal; and
change the at least one of the speed and steering of the second autonomous vehicle in accordance with the preference when it is determined that it would be safe and legal to do so; and
leave the at least one of the speed and steering of the second autonomous vehicle unchanged in contravention of the preference when it is determined that it would be unsafe or illegal to act in accordance with the preference.

16. The system of claim 12, wherein
the preference is a preferred turning speed;
wherein the software is further programmed to, for each turn autonomously determined to be executed by the software, (a) evaluate the preferred turning speed with respect to safe and legal limits for the each turn, and (b) when the preferred turning speed is within the safe and legal limits for the each turn, autonomously execute the each turn at the preferred turning speed.

17. The system of claim 16, wherein the preferred turning speed is a percentage of a maximum turning speed.

* * * * *